United States Patent [19]
Hasegawa et al.

[11] Patent Number: 4,515,009

[45] Date of Patent: May 7, 1985

[54] METHOD FOR DETECTING OPENING OF A THROTTLE VALVE IN A FULLY CLOSED POSITION IN AN INTERNAL COMBUSTION ENGINE

[75] Inventors: Shumpei Hasegawa, Niiza; Yutaka Otobe, Shiki, both of Japan

[73] Assignee: Honda Giken Kogyo Kabushiki Kaisha, Tokyo, Japan

[21] Appl. No.: 456,605

[22] Filed: Jan. 10, 1983

[30] Foreign Application Priority Data

Jan. 14, 1982 [JP] Japan .................................... 57-4124

[51] Int. Cl.[3] .......................................... G01M 15/00

[52] U.S. Cl. ...................................... 73/118; 123/478

[58] Field of Search ..................... 73/118, 116, 118 A; 123/478

[56] References Cited

U.S. PATENT DOCUMENTS 4,359,894 11/1982 Ikeura et al. ..................... 73/118 A

*Primary Examiner*—John W. Caldwell, Sr.
*Assistant Examiner*—Ellwood G. Harding
*Attorney, Agent, or Firm*—Arthur L. Lessler

[57] ABSTRACT

A method for detecting the opening of a throttle valve in a fully closed position in an internal combustion engine. The opening of the fully closed throttle valve is detected at intervals of time corresponding to the pulse separation of a predetermined timing pulse signal. When it is determined that a detected value of the valve opening is smaller than a value of the valve opening previously detected and presently stored, and the detected value has kept the same value for a substantial period of time, the detected value is newly stored in place of the above presently stored value.

6 Claims, 4 Drawing Figures

METHOD FOR DETECTING OPENING OF A THROTTLE VALVE IN A FULLY CLOSED POSITION IN AN INTERNAL COMBUSTION ENGINE

BACKGROUND OF THE INVENTION

This invention relates to a method for detecting the opening of a throttle valve in a fully closed position in an internal combustion engine, which can detect the valve opening in an accurate and positive manner.

In conventional electronic fuel supply control systems, electronic suction air quantity control systems and other electronic control systems for internal combustion engines, the opening of a throttle valve arranged in the intake pipe of an engine, which forms a parameter indicative of the operating condition of the engine, is detected in the form of an electrical signal, and the electrical signal indicative of detected values of the valve opening is processed in an electronic control unit or like means, for use in respective controls. Particularly at engine idle, it is important for proper control of the engine operation to accurately determine whether or not the throttle valve is really in its proper fully closed position, i.e. in the idle opening position. To ensure accuracy of the determination, high detecting accuracy is required of a throttle valve opening sensor. Conventional throttle valve opening sensors include a type comprising a potentiometer directly coupled to the valve shaft of the throttle valve and a type comprising a vacuum intake port opening in the intake pipe at a location immediately upstream of the throttle valve in a fully closed position, a diaphragm actuatable by vacuum applied thereto through the vacuum intake port, and a potentiometer coupled to the diaphragm. According to these type sensors, the sensor output can be affected by the machining tolerances and assembling and mounting tolerances of the sensors, wear of the valve body and other sliding parts of the throttle valve, or other factors such as aging, making it difficult to always detect the valve opening of the throttle valve, particularly the idle opening, with accuracy.

To eliminate the above disadvantage, a method has been proposed by U.S. Pat. No. 4,359,894 to Ikeura et al., which is adapted to determine whether or not the throttle valve is in its proper fully closed position, by storing into a memory a lowest voltage value of an output signal of a throttle valve opening sensor, comparing the sum of the above lowest voltage value and a voltage value corresponding to the machining tolerances and assembling and mounting tolerances of the throttle valve or the insensitive output range of same with each of voltage values of the valve opening subsequently detected by the sensor, and storing a subsequently detected value into the memory as a new lowest voltage value when the subsequently detected value is determined to be lower than the previously stored value.

However, sometimes a value can be erroneously temporarily detected which is smaller than the actual throttle valve opening and also lower than the presently stored lowest voltage value, due to noises occurring in the supply line or processing system for the throttle valve opening signal or other disturbances. In such event, the above proposed method cannot avoid the disadvantage that the above false smaller detected value is stored into the memory as a lowest voltage value, i.e. a signal indicative of the fully closed position of the throttle valve.

SUMMARY OF THE INVENTION

It is the object of the invention to provide a method for detecting the opening of a throttle valve in a fully closed position, which can detect the valve opening in an accurate and positive manner without being affected by the machining tolerances and assembling and mounting tolerances of the throttle valve, wear of the valve body and other sliding parts, of same, etc. as well as noises occurring in the supply line or processing system for the throttle valve opening signal.

The present invention is based upon recognition of the facts that the throttle valve has a minimum opening at engine idle, as compared with all the other operating conditions of the engine, the opening of the throttle valve is mechanically maintained at a constant value at engine idle so that a digital value obtained by subjecting the voltage of a valve opening signal to analog-to-digital conversion continuously shows a substantially constant value, and further an idling condition of the engine lasts for a relatively long period of time.

The throttle valve opening detecting method according to the invention comprises the steps of (a) detecting the opening of the throttle valve at intervals of time corresponding to the pulse separation of a predetermined timing pulse signal when the throttle valve is in a fully closed position and storing a value thus detected, (b) comparing the above newly detected value with a value indicative of the opening of the fully closed throttle valve previously detected and presently stored, (c) determining whether or not the newly detected value has kept the same value for a substantial period of time, and (d) storing the newly detected value in place of the above presently stored value, for use in control of operation of the engine, when it is determined at the step (b) that the newly detected value is smaller than the presently stored value and it is also determined at the step (c) that the newly detected value has kept the same value for the substantial period of time.

The above and other objects, features and advantages of the invention will be more apparent from the ensuing detailed description taken in connection with the accompanying drawings.

DETAILED DESCRIPTION

The method according to the invention will now be described in detail with reference to the accompanying drawings.

Figure 1:
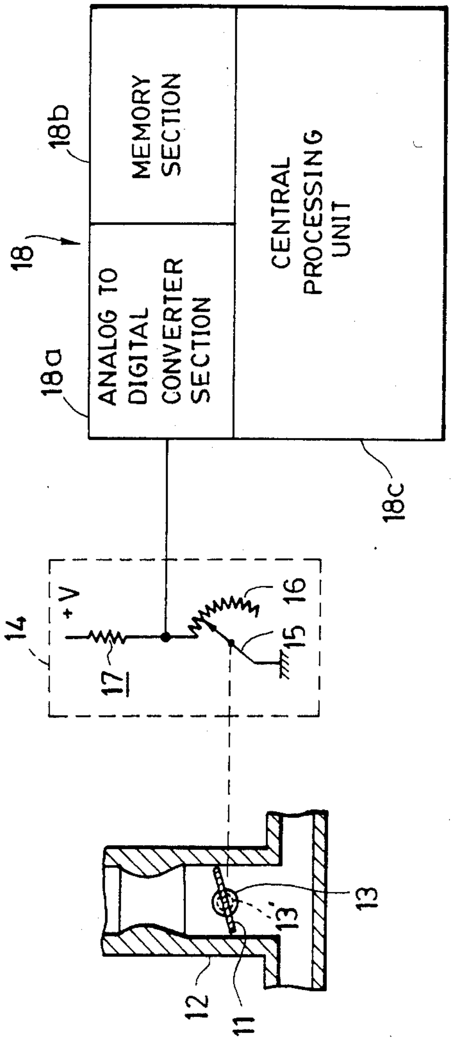
FIG. 1 is a schematic view illustrating a connection of a throttle valve, a throttle valve opening sensor and an electronic control unit (ECU), to which is applicable the method of the present invention.

FIG. 1 schematically illustrates an arrangement of a throttle valve, a throttle valve opening sensor and an electronic control unit (hereinafter called "ECU"), to which can be applied the method of the invention. The arrangement of FIG. 1 can form part of an electronic fuel supply control system, part of an electronic suction air quantity control system, etc. In FIG. 1, the throttle valve 11 is arranged in an intake pipe 12 of an engine, for rotation about a rotary shaft 13 mounted in the intake pipe 12, to which is coupled another rotary shaft 13' for rotation in unison therewith, which is connected to a potentionmeter 14 forming the throttle valve opening sensor. A sliding element 15 of the potentiometer 14 is secured on the rotary shaft 13' connected to the potentiomenter 14, for pivoting about its one end in unison with the rotary shaft. This sliding element 15 has one end disposed in sliding contact with a resistance surface of a resistance element 16 for sliding therealong with rotation of the rotary shaft 13' of the potentiometer 14. The other end of the sliding element 15 is grounded. The resistance element 16 is connected to one end of a fixed resistance 17 which has its other end connected to a direct current constant-voltage regulated power supply, not shown, with the junction of the resistance element 16 with the fixed resistance 17 connected to an analog to digital converter section of the ECU 18. As the sliding element 15 slidingly moves on the resistance surface of the resistance element 16, the potential at the above junction varies, which is supplied to the ECU 18 as a signal indicative of the opening of the throttle valve 1. The signal is converted into a digital signal by an analog to digital converter section 18*a* of the ECU 18. A digital signal indicative of a detected value of the throttle valve in a fully closed position (hereinafter called "idle opening") is compared with a stored digital value indicative of a previously detected idle opening value and stored in a memory section 18*b* of the ECU 18 as a minimum idle opening value, by a central processing unit (hereinafter called "CPU") 18*c*. When the comparison results in the former being smaller than the latter, the former or the newly detected value is stored into the memory section 18*b* in place of the latter or the previously detected and stored minimum idle opening value. As described later, the comparison between each newly detected value and the stored value is repeatedly carried out in synchronism with a predetermined timing pulse signal such as a signal indicative of a top dead center (TDC) of the engine (herafter called a "TDC signal"), so as to obtain an accurate idle opening value without fail.

Figure 2:
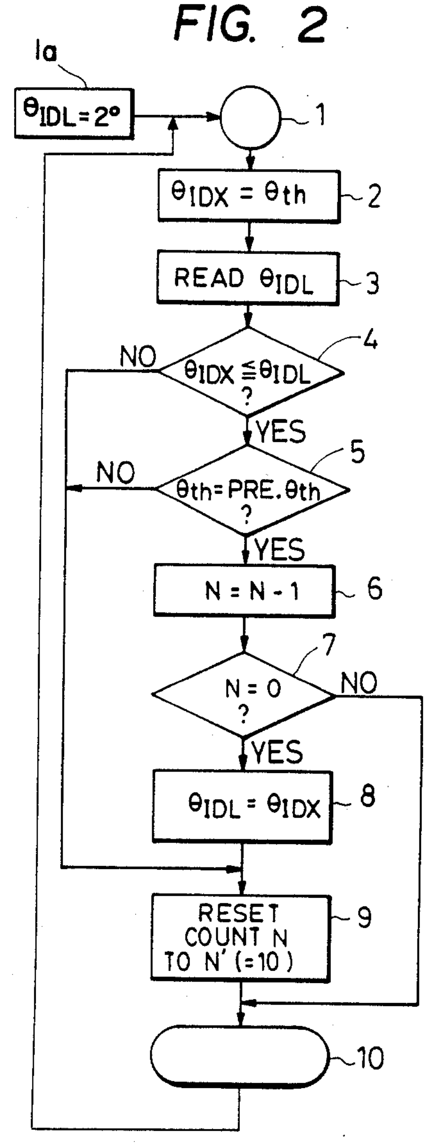
FIG. 2 is a flow chart showing a method for detecting the opening of a throttle valve in a fully closed position, according to one embodiment of the invention.

Referring next to FIG. 2, there is shown a flow chart of a routine for executing one embodiment of the idle opening detecting method of the invention. This routine is executed each time each pulse of the aforementioned predetermined timing pulse signal such as a TDC signal associated with each engine cylinder or one selected engine cylinder is inputted to the ECU 18. When the routine is called at the step 1, a throttle valve opening θth, which has been detected by the throttle valve opening sensor 14 coupled to the throttle valve 1 at engine idle, for instance, is loaded into an associated register as a provisional idle opening value θIDX, each time each pulse of the TDC signal is inputted to the ECU 18, at the step 2. Next, a value θIDL of the idle opening stored in the memory section 18*b* of the ECU 18 as the minimum value of values so far detected is read from the memory section 18*b*, and the read value is compared with the above provisional value θIDX, at the step 4. When the comparison shows unfulfillment of the relationship of $\theta IDX \leqq \theta IDL$, that is, when the throttle valve opening θth detected in the present loop is larger than the presently stored idle opening value θIDL, the program proceeds to the step 9 where a count N in an associated counter is reset to a predetermined number N', terminating the execution of the routine in the present loop (the step 10). As long as a detected throttle valve opening value θth is larger than the presently stored idle opening value θIDL, the CPU 18*c* judges that the presently stored idle opening value θIDL is still the minimum value of the values so far detected during operation of the engine, and continues to use the same value θIDL as an idle opening value for use in fuel supply control, suction air quantity control, etc.

When fulfillment of the relationship of $\theta IDX \leqq \theta IDL$ is determined at the step 4, that is, when a valve opening value θth inputted to the ECU 18 in the present loop is equal to or smaller than the presently stored idle opening value θIDL, the program proceeds to the step 5, where it is determined whether or not a valve opening value θth inputted in the preceding loop is equal to the one inputted in the present loop, that is, whether or not the valve opening value θth has remained constant from the preceding loop to the present loop. If the answer to the question of the step 5 is affirmative, the count N in the associated counter is reduced by 1, at the step 6. A further determination is made as to whether or not the reduced count N is equal to zero, at the step 7. When the count N is not equal to zero, the execution of the routine in the present loop is terminated, at the step 10. The initial value of the above count N is set to a value equal to the predetermined value N' to which the counter is reset at the step 9 and which corresponds to a period of time sufficient for accurately measuring the opening of the throttle valve in a fully closed position without being affected by noises or other disturbances. For instance, it is set at 10. After it has been determined at the step 4 that the throttle valve opening value θth has become smaller than the presently stored value θIDL for the first time, the above described routine is repeatedly executed ten times for instance, each time each pulse of the TDC signal is inputted to the ECU 18 so long as the throttle valve opening value θth remains the same as the one obtained in the preceding loop. When the repeated number of execution of the routine reaches ten for instance, it is determined that the count N is zero, at the step 7. When the determination of the count N being zero is obtained at the step 7, the presently stored idle opening value θIDL is replaced by the above provisional idle opening value θIDX, at the step 8, which means that the renewed stored idle opening value θIDL has a value smaller than the previous one θIDL. Then, the program proceeds to the step 9, where the count N is set to 10, terminating the execution of the present loop of the routine. Since as mentioned above renewal of the stored idle opening value θIDL is not effected unless the throttle valve opening values in the present and preceding loops remain the same over a predetermined number of times, the disadvantage can be avoided that the stored idle opening value θIDL is replaced by a smaller value erroneously temporarily detected due to noises or other disturbances.

When it is determined at the step 5 that the throttle valve opening value θth obtained in the present loop is not equal to the one obtained in the preceding loop, the program proceeds to the step 9, where the count N in the counter is reset to 10, terminating the execution of the present loop of the routine. Incidentally, upon occurrence of a predetermined event associated with the start of the engine, the stored idle opening value θIDL is set to a predetermined initial value, e.g. 2 degrees as shown at step 1*a* of FIG. 2.

Figure 3:
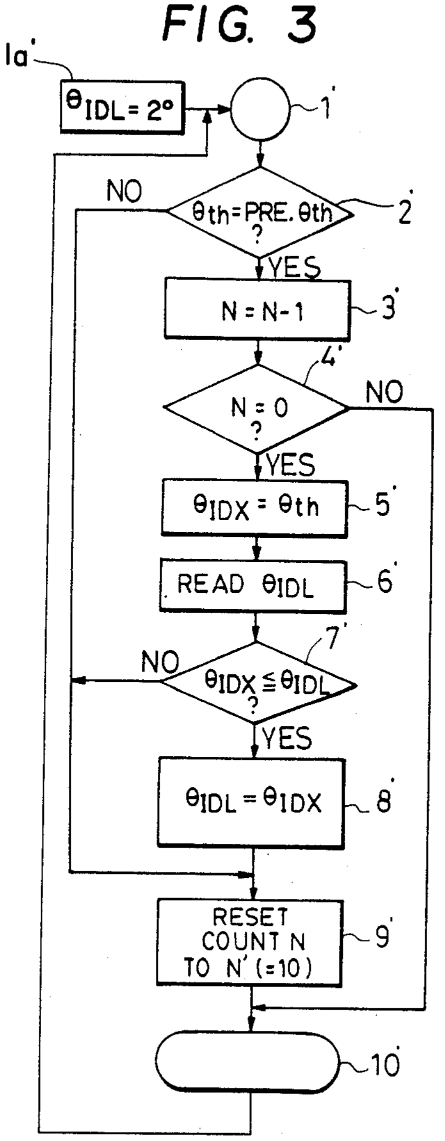
FIG. 3 is a flow chart showing the method of the invention according to a further embodiment thereof.

FIG. 3 shows a flow chart of a routine for execution of another embodiment of the method of the invention. This embodiment is different from the embodiment in FIG. 2 in the order of execution of steps. At the start of the engine, the stored value of the throttle valve opening is initialized at the step 1*a*. When the routine is called at the step 1′, a determination is made as to whether or not the throttle valve opening value θth inputted in the present loop is equal to the one inputted in the preceding loop, at the step 2′. If the answer to the question of the step 2′ is negative or no, the count N in the counter is reset to the predetermined value N′, e.g. 10 at the step 9′, terminating the execution of the present loop of the routine. If the question of the step 2′ gives an affirmative answer, the count N is reduced by 1, at the step 3′. If the new or reduced count N is not equal to zero as a result of a determination at the step 4′, the execution of the present loop of the routine is terminated.

Since as noted above, the initial value of the count N at the step 3′ is reset to the predetermined value N′, e.g. 10 at the step 9′ as in the routine of FIG. 2, the above described routine is repeatedly executed each time each pulse of the TDC signal is inputted to the ECU 18 after the throttle valve opening values θth have become equal to each other between the present loop and the preceding loop, so long as the throttle valve opening value θth in the present loop remains constant. When the repeated number N reaches the predetermined number N′ or 10, it is determined at the step 4′ that the relationship of N=0 stands. When fulfillment of the relationship of N=0 is determined, the throttle valve opening value θth in the present loop is loaded into the register as a provisional idle opening value θIDX, at the step 5′. Then, it is determined at the step 7′ whether or not the above provisional idle opening value θIDX is smaller than the presently stored idle opening value θIDL. If the determination at the step 7′ gives a negative answer or no, the count N is reset to the predetermined number N′ or 10, and then the execution of the present loop of the routine is terminated. That is, in this case, the presently stored idle opening value θIDL is still continuously used as an idle opening value for the aforementioned controls.

If the answer to the question of the step 7′ is affirmative or yes, this means that a throttle valve opening value has been detected, which is smaller than the presently stored idle opening value θIDL. Thus, the provisional idle opening value θIDX is stored into the memory as a new idle opening value θIDL, at the step 8′. Then, the count N in the counter is reset to the predetermined value N′, terminating the execution of the present loop of the routine.

Figure 4:
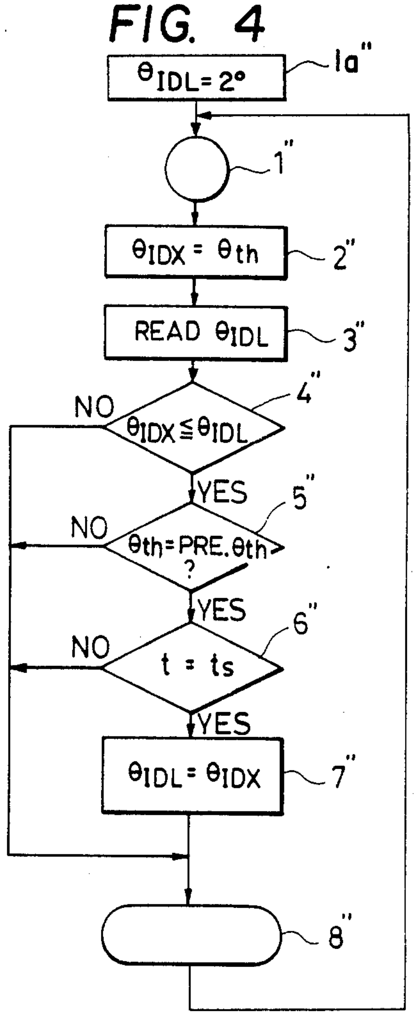
FIG. 4 is a flow chart showing the method of the invention according to a still further embodiment thereof.

FIG. 4 shows a flow chart of a routine for execution of a still further embodiment of the method of the invention. This embodiment is distinguished from the two previous embodiments in that a predetermined period of time ts is used instead of the predetermined number N which corresponds to a predetermined number of detections of the throttle valve opening, to determine whether or not a detected value θth of the throttle valve opening has kept the same value or remained constant. In the routine of FIG. 4, the steps 1*a*–5″ are identical with the steps 1*a*–5 of the routine of FIG. 2. When it is determined at the step 5″ that the throttle valve opening value θth in the present loop is equal to the one in the preceding loop, it is determined at the step 6″ whether or not a period of time t passing after the above determination at the step 5″ has been obtained for the first time has reached a predetermined period of time ts. If the determination of the step 6″ gives an affirmative answer, the presently stored idle opening value θIDL is replaced by the provisional idle opening value θIDX obtained at the step 2″, followed by termination of the execution of the present loop of the routine. On the other hand, if the answer to the question of the step 6″ is negative, the execution of the present loop is immediately terminated.

The presently stored idle opening value θIDL obtained in the above described manner has the minimum one of values so far obtained during the present operation of the engine. In practice, the actual fully closed position of the throttle valve can vary due to vibrations of the engine or intrusion of dust or the like into the throttle valve. In view of this possibility, the following manner of actually applying the presently stored idle opening value θIDL to control an electronic fuel supply control system, or an electronic suction air quantity control system, etc. is recommended: A flag signal issuing value θIDLH indicative of an idle condition of the engine is provided, which is determined by the following equation (1):

$$\theta IDLH = \theta IDL + \Delta\theta IDL \tag{1}$$

where ΔθIDL is a constant having a value corresponding to the possible variable range of the fully closed position of the throttle valve, and is set at a value corresponding to a throttle valve rotational angle of 0.5 degrees, for instance. The above flag signal issuing value θIDLH is compared with the actual throttle valve opening value θth. When the latter value θth is equal to or smaller than the former value, it is judged that the throttle valve is in its proper fully closed position, issuing a flag signal indicating that the throttle valve is in its proper fully closed or idle position to be supplied to the electronic fuel supply control section, suction air quantity control section, etc. in the ECU 18. More specifically, the above flag signal is issued when it is determined that the actual throttle valve opening value θth is smaller than the flag signal issuing value θIDLH which is larger than the stored idle opening value θIDL by a value corresponding to the rotational angle of 0.5 degrees. Thus, even in the event that the fully closed position of the throttle valve slightly varies due to engine vibrations or presence of dust or the like in the valve, it is possible to positively determine whether or not the throttle valve is substantially in the proper fully closed position, enabling achievement of stable control at engine idle.

What is claimed is:

1. In a method for detecting the opening of a throttle valve in an internal combustion engine having an intake passage in which said throttle valve is arranged, having the steps of:

(a) constantly detecting the opening of the throttle valve at intervals of time corresponding to the pulse separation of a predetermined timing pulse signal and storing a value thus detected, (b) comparing said detected value with a value indicative of the opening of the throttle valve previously detected and presently stored, and (c) storing said detected value as a value indicative of the opening of the throttle valve in a fully closed position, in place of said presently stored value, for use in control of operation of the engine, when it is determined at the step (b) that said detected value is smaller than said presently stored value;

the improvement comprising:

(d) setting said presently stored value to a predetermined initial value upon occurrence of a predetermined event associated with the start of the engine;

(e) repetitively determining whether or not said detected value has kept the same value for a substantial period of time which is sufficient for measuring the opening of the throttle valve in a fully closed position without being affected by noises or other disturbances; and (f) in the step (c), storing said detected value in place of said presently stored value, only when it is determined at the step (e) that said detected value has kept the same value for said substantial period of time, said predetermined timing pulse signal comprising a pulse signal each pulse of which is generated at each of one or more predetermined rotational positions of the engine.

2. A method as claimed in claim 1, wherein the lapse of said substantial period of time is determined in terms of a predetermined number of detections of the throttle valve opening effected when the throttle valve is in a fully closed position.

3. A method as claimed in claim 1, wherein said substantial period of time comprises a predetermined period of time.

4. In a method for detecting the opening of a throttle value in an internal combustion engine having an intake passage in which said throttle valve is arranged, having the steps of:

(a) constantly detecting the opening of the throttle valve at intervals of time corresponding to the pulse separation of a predetermined timing pulse signal and storing a value thus detected, (b) comparing said detected value with a value indicative of the opening of the throttle valve previously detected and presently stored, and (c) storing said detected value as a value indicative of the opening of the throttle valve in a fully closed position, in place of said presently stored value, for use in control of operation of the engine, when it is determined at the step (b) that said detected value is smaller than said presently stored value;

the improvement comprising:

(d) setting said presently stored value to a predetermined initial value upon occurrence of a predetermined event associated with the start of the engine;

(e) repetitively determining whether or not said detected value has kept the same value for a substantial period of time which is sufficient for measuring the opening of the throttle valve in a fully closed position without being affected by noises or other disturbances, when it is determined at the step (b) that said detected value is smaller than said presently stored value; and (f) in the step (c), storing said detected value in place of said presently stored value, only when it is determined at the step (c) that said detected value has kept the same value for said substantial period of time, said predetermined timing pulse signal comprising a pulse signal each pulse of which is generated at each of one or more predetermined rotational positions of the engine.

5. In a method for detecting the opening of a throttle valve in an internal combustion engine having an intake passage in which said throttle valve is arranged, having the steps of:

(a) constantly detecting the opening of the throttle valve at intervals of time corresponding to the pulse separation of a predetermined timing pulse signal and storing a value thus detected, (b) comparing said detected value with a value indicative of the opening of the throttle value previously detected and presently stored, (c) storing said detected value as a value indicative of the opening of the throttle valve in a fully closed position, in place of said presently stored value, for use in control of operation of the engine, when it is determined at the step (b) that said detected value is smaller than said presently stored value;

the improvement comprising:

(d) setting said presently stored value to a predetermined initial value upon occurrence of a predetermined event associated with the start of the engine;

(e) before execution of the step (b), repetitively determining whether or not said detected value has kept the same value for a substantial period of time which is sufficient for measuring the opening of the throttle valve in a fully closed position without being affected by noises or other disturbances; and (f) in the step (b), comparing said detected value with said presently stored value, only when it is determined at the step (e) that said detected value has kept the same value for said substantial period of time, said predetermined timing pulse signal comprising a pulse signal each pulse of which is generated at each of one or more predetermined rotational positions of the engine.

6. The method as claimed in claim 5, wherein the lapse of said substantial period of time is determined in terms of a predetermined number of detections of the throttle valve opening effected when the throttle valve is in a fully closed position.

* * * * *